July 3, 1956  R. W. J. FRANKLIN  2,752,713
ORNAMENTED SPECTACLE FRAMES
Filed July 15, 1954
FIG.1.
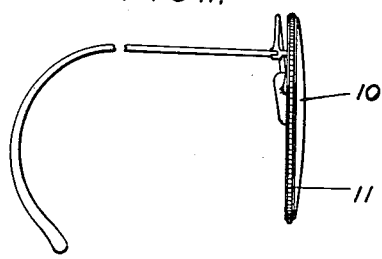
FIG.2.
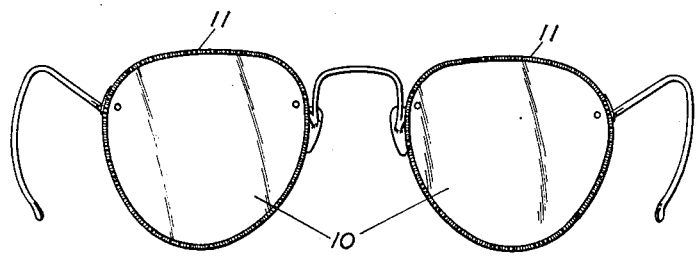
FIG.3.                FIG.4.
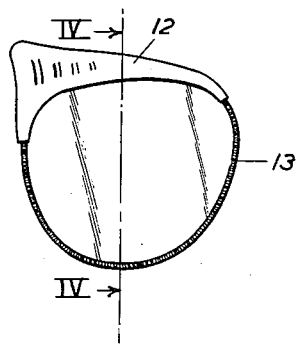    
*Inventor*
RONALD W. J. FRANKLIN
By
Holcombe Wetherill & Buseboy
*Attorneys*

United States Patent Office 2,752,713
Patented July 3, 1956

2,752,713

ORNAMENTED SPECTACLE FRAMES

Ronald William James Franklin, London, England

Application July 15, 1954, Serial No. 443,581

Claims priority, application Great Britain July 24, 1953

4 Claims. (Cl. 41—34)

This invention relates to spectacles.

It is an object of the present invention to provide spectacles having decorative adornment which can be altered as desired, or removed entirely.

The invention provides detachable lens attachments at least a part of each attachment being decorative and directly visible from the front of the spectacles, each of the said attachments comprising a flexible elastically expansible member which fits against the periphery of the lens.

These decorative lens appendages can readily be attached to and removed from the spectacles as required. The owner of a single pair of spectacles may have two or more sets of interchangeable decorative attachments of different shapes or colours so that the appearance of the spectacles can be altered as desired to suit different occasions or to go with different styles of dress.

The invention will now be described with reference to the accompanying drawings, but it is to be understood that the described embodiments are given purely by way of example and not in any limiting sense, the scope of the invention being determined by the appended claims.

In the drawings,

Figure 1 is a side view of a pair of spectacles embodying one form of the invention, Figure 2 is a front view of the spectacles shown in Figure 1, Figure 3 is a modified form of lens attachment suitable for use with spectacles of the kind shown in Figures 1 and 2, and Figure 4 is a fragmentary sectional view, on a larger scale, on the line IV—IV of Figure 3.

In the spectacles shown in Figures 1 and 2 the lenses 10 are of the type known as rimless wherein the bridge and temples are screwed or otherwise secured directly to the lenses at appropriate points, and the lenses themselves are provided with shallow grooves around their outer edges. In the groove around the edge of each lens 10 is fitted a frame 11 which is in the form of an endless flexible elastically expansible coil spring which can be sprung over the edge of the lens and held in place in the said groove by virtue of its own tension.

The frames are arranged to stand proud of the grooves so that they are clearly visible from the front, as shown in Figure 2. These frames may be appropriately coloured.

The simple coloured frames shown in Figures 1 and 2 may be replaced by more elaborate attachments, for instance as shown in Figure 3, in which there is a rigid decorative segment 12 arranged to lie over the top edge of the lens and attached to a length of flexible elastically expansible coil spring 13 which is arranged to fit in the groove around the lower edge of the lens.

What I claim as my invention and desire to secure by Letters Patent is:

1. Spectacles comprising two lenses with circumferential grooves formed in their edges, supporting means for said lenses independent of said grooves, and detachable decorative frames fitting around said grooves, each frame comprising a rigid decorative portion having its inner surface curved to conform to a portion of the grooved edge of the lens upon which it is mounted and a flexible expansible portion made of coiled spring wire and secured to the ends of said decorative portion partly lying in said groove and directly visible from the front of said spectacles.

2. Spectacles comprising two lenses with circumferential grooves formed in their edges, supporting means for said lenses independent of said grooves and detachable decorative frames fitting around said edges, each frame comprising a rigid decorative segment having its under surface shaped to fit on an upper segment of the lens to which it is applied and a loop of flexible elastically-expansible material of a cross-section adapted to seat in the groove around said lens while projecting therefrom and secured by both ends to said rigid decorative segment, the unstretched length of said loop being slightly less than the length of the remainder of the edge of said lens.

3. A decorative frame adapted to fit in a detachable manner around the edge of a lens of a pair of rimless spectacles, which edge is provided with a circumferential groove, comprising a rigid decorative segment having its under surface shaped to fit on to an upper segment of said edge and a loop of flexible elastically-expansible material of a cross-section adapted to seat in said groove but project therefrom secured by both ends to said rigid decorative segment, the unstretched length of said loop being slightly less than the length of the remainder of said edge.

4. A decorative frame according to claim 3 in which said flexible elastically-expansible material is a coil spring.

References Cited in the file of this patent

UNITED STATES PATENTS

| | | |
|---|---|---|
| 1,722,591 | Poeton | July 30, 1929 |
| 1,932,261 | Beattey | Oct. 24, 1933 |
| 1,996,183 | Walters | Apr. 2, 1935 |
| 2,061,630 | Keys | Nov. 24, 1936 |
| 2,387,789 | Williams | Oct. 30, 1945 |